United States Patent

Schutz

[19]

[11] Patent Number: 5,556,660
[45] Date of Patent: Sep. 17, 1996

[54] PROCESS FOR SHAPING A STRAIGHT ROPE OF DOUGH INTO A PRETZEL

[76] Inventor: Otto Schutz, Albert-Rosshaupter-Str. 65, D-81369 Munchen, Germany

[21] Appl. No.: 379,509

[22] PCT Filed: Jul. 28, 1993

[86] PCT No.: PCT/EP93/02012

§ 371 Date: Jan. 26, 1995

§ 102(e) Date: Jan. 26, 1995

[87] PCT Pub. No.: WO94/03069

PCT Pub. Date: Feb. 17, 1994

[30] Foreign Application Priority Data

Jul. 29, 1992 [DE] Germany .............................. 42 25 066.8

[51] Int. Cl.⁶ ............................................. A21C 3/08
[52] U.S. Cl. ..................... 426/499; 426/500; 426/512; 425/323; 425/391
[58] Field of Search ..................... 426/499, 500, 426/512, 517, 496; 425/323, 391, 403, 470

[56] References Cited

U.S. PATENT DOCUMENTS

| | | | |
|---|---|---|---|
| 1,397,233 | 11/1921 | Robbins | 425/323 X |
| 5,009,910 | 4/1991 | Zwicker | 429/499 |

FOREIGN PATENT DOCUMENTS

| | | | |
|---|---|---|---|
| 3208105 | 9/1983 | Germany . | |
| 3900950 | 7/1990 | Germany | 425/323 |
| 3939013 | 5/1991 | Germany | 425/323 |
| 4032466 | 4/1992 | Germany . | |
| 4105254 | 5/1992 | Germany . | |
| 4100158 | 7/1992 | Germany . | |
| 444790 | 2/1968 | Switzerland | 425/323 |
| 470839 | 4/1969 | Switzerland . | |
| 9319607 | 10/1993 | WIPO | 425/323 |
| 9403068 | 2/1994 | WIPO | 425/323 |

Primary Examiner—Esther M. Kepplinger
Assistant Examiner—Milton I. Cano
Attorney, Agent, or Firm—Mallinckrodt & Mallinckrodt

[57] ABSTRACT

The invention pertains to a process for producing the looped form of a pretzel from a straight, stretched rope of dough (1) using a machine so as to lower the production costs in pretzel making. Essentially, the central part (4) of the straight rope of dough (1) is taken up by the receiving part of a mold (3), then the front section of the receiving part of the mold (3) swings upwards and the receiving part of the mold (3) is turned along with the central part (4) of the rope of dough (1) by 360° relative to the ends of the rope of dough (1) so that both sides of the rope are looped together.

20 Claims, 13 Drawing Sheets

PROCESS FOR SHAPING A STRAIGHT ROPE OF DOUGH INTO A PRETZEL

The invention relates to a process for producing the twisted shape of a pretzel from a previously straight, linear dough strand with the aid of a machine in order to lower the production costs of the pretzels.

Of course, pretzels can be pressed into the desired pretzel shape by means of a two-part mold.

The fresh pretzels—which are a favorite, especially, in Southern Germany—consist, however, of a dough which cannot be extruded, but have to be rolled to form a dough strand from which the pretzels then have to be twisted. The desired inner consistency of these baked products is achieved only by the dough strand which has a rolled cross-sectional form.

Consequently, mechanical production of the pretzels also has to start off with such a rolled, initially straight dough strand.

It is known, for example from DE-PS 3 841 395, by means of a corresponding apparatus which operates with suckers, to seize the ends of such a dough strand, draw them upwards, twist them and deposit them in a corresponding position on the central region of the dough strand and to press-fix them, that is to say to reproduce as faithfully as possible the manual operation of pretzel twisting.

However, this process is disadvantageous because it is the relatively thin ends of the dough strand which are particularly difficult to handle and, furthermore, a process which operates by seizing the ends of the dough strand is made more difficult by the fact that, due to the rolling-out of the dough to form a dough strand, this dough strand may be of a relatively greatly differing length, with the result that the gripping positions can be established only by essentially prior measurement of the dough strand.

In addition, such a process cannot be carried out on the running transporting belt for the dough strands, but only within the context of a separate operating station.

It is further known, from DE-OS 3 900 950, by means of a receiving mold part which is in the form of a scoop, to receive the central part of the dough strand and, with the scoop slightly raised and held approximately horizontally, to rotate said scoop through 360° to achieve the central knot and then to deposit the dough strand again.

The disadvantage of this process consists in the fact that, due to the twisting movement in the case of which the central part of the dough strand is located the horizontal plane, assymetrical pretzels result since one dough-strand end is pulled more strongly than the other, which, in an extreme case, can even be subjected to compressive loading. This results, during the twisting operation, in dough-strand ends which are not only of different thicknesses, but also of different lengths, with the result that these pretzels are not only asymmetrical in their configuration, but also the compressed dough-strand ends, in certain circumstances, are no longer covered over by the central region after depositing, so that actually no pretzel at all is produced.

A further disadvantage of this process consists in the fact that the scoop design as receiving mold part has to be moved towards the dough strand in the horizontal plane, transversely with respect to the longitudinal extent of the original dough strand and thus, when carrying out the twisting movement on the transporting belt of the dough strands, the latter have to lie on the belt transversely with respect to the transporting direction in order to achieve reliable receiving.

Taking the last-mentioned prior art as the departure point, the object of the present invention is to provide a process for the mechanical twisting pretzels, which function simply and reliably with as constant a result as possible, makes as few mechanical requirements as possible in terms of handling of the unbaked dough strand, and can be carried out with as simple an apparatus as possible.

Since the twisting movement is only carried out if the central part of the dough strand is located in an essentially vertical plane and, then, runs over the highest point of the corresponding receiving mold part, a symmetrical pretzel is receiving during twisting, this additionally being aided by the ends of the dough strand being held down.

In this arrangement, the dough strand can be received by the receiving mold part in that the latter—in the state where it is tilted into the vertical—is moved towards the central part of the dough strand essentially vertically from above, and said central part of the dough strand is pressed by corresponding gripping members against an oppositely directed gripping member or a supporting edge which is arranged fixedly in the receiving mold part on one side thereof, and the receiving mold part is then pivoted upwards around a horizontal spindle until another vertical position of the receiving mold part is reached.

It is likewise also possible, however, to move the receiving mold part into a horizontal or obliquely downwardly oriented position and to move it towards the central part of the dough strand horizontally and seize the same. In this case too, gripping members which are directed towards one another and are arranged on the receiving mold part, on both sides thereof, are conceivable for carrying out the process, as is a projecting supporting edge which is formed along that circumferential edge of the receiving mold part which is at the bottom in this position.

In order, however, to ensure that, during subsequent depositing and pressing of the twisted pretzel and press-fixing of the desired joining parts of the dough strand, the supporting edge is not, at that point in time, located on the underside of the receiving mold part, which is then located approximately horizontally, said supporting edge is to be arranged on the subsequent upper side of the receiving mold part.

This means that, if the receiving mold part is moved towards the dough strand horizontally, in which case said supporting edge has to be located on the underside, the receiving mold part subsequently has to be pivoted away downwards to the rear, beyond the lowermost point in the vertical position of the receiving mold part, until said receiving mold part again assumes a vertical position, where it is rotated through 190°.

Consequently, a pivot movement through altogether almost 270° is necessary if the receiving mold part is to be moved towards the dough strand horizontally in order to receive the same.

In addition, the receiving mold part has, over at least 180°, a circumferential surface which corresponds to the subsequent inner contour of the central part of the pretzel, with the result that, when the receiving mold part has been tilted upwards, the side regions adjoining the central region of the dough strand hang down vertically from said circumferential surface, while the ends of the dough strand bear on the underlying surface and are still located in the holding-down devices which are provided for the case where there is insufficient static friction between the dough strand ends and the underlying surface.

Furthermore, after twisting of the dough strand, that part of the dough strand which is arranged around the receiving mold part is pulled, the receiving mold part executing a movement transverse to the longitudinal extent of the original dough strand.

For this purpose, after or during tilting of the receiving mold part into an approximately horizontal position above the twisted knot, the receiving mold part is moved to the rear by means of its rear region, with the result that the sides of the twisted pretzel come to lie at the desired position above the ends of the dough strand.

In this stage, the receiving mold part is still arranged slightly obliquely, the rear region of the receiving mold part almost reaching the underlying surface, but the front region being located at a higher level. By virtue of a subsequent transverse movement in the opposite direction, that part of the dough strand located around the rear region of the receiving mold part is released—if appropriate assisted by active elements —and is deposited on the underlying surface. By virtue of subsequent reversal of the transverse movement of the receiving mold part anew, that is to say this time away from the central part of the dough strand, and assisted as much as possible by simultaneous tilting of the receiving mold part, so that the front region thereof assumes the lowermost point and the rear region thereof assumes a higher position, the central part of the dough strand is also deposited.

The receiving mold part is then once again moved in the transverse diretion towards the central region of the original dough strand, with the result that the receiving mold part is located both over the crossover points of the ends of the dough strand and over the central knot. By virtue of lowering the receiving mold part, which is held approximately horizontally, the crossover points of the ends of the dough strand then interact with the regions of the dough strand which are located thereabove, if appropriate, pressing surfaces which can extend outwards being arranged on the receiving mold part for thee purpose.

In the same way a central pressing surface for pressing the central knot of the pretzel may be provided in the center of the receiving mold part.

In order to ensure that the central region of the dough strand is received onto the receiving mold part in as problem-free manner as possible, the receiving mold part is preferably also moved additionally in the transverse direction during initial tilting upwards such that the dough strand itself does not have to move in the transverse direction, and the received central part of the dough strand simply moves upwards in a vertical plane.

Another possibility for the central part of the dough strand to be received by the receiving mold part in a problem-free manner consists in the fact that, during the receiving operation, the outer contour of the receiving mold part has a less pronounced curvature and, in an extreme case, assumes a fully linear form-during the receiving operation.

Then, the receiving mold part, which is at least linear in the center in this case, can be moved towards the dough strand, over a dough-strand central region of any size, and the latter can be secured.

It is only when the dough strand is tilted upwards or even after this, before the twisting movement is carried out, that the receiving mold part is then bent together to form the final contour which corresponds to the subsequent inner contour of the pretzel.

Such a twisting machine is preferably located above the transporting belt on which the linear, unbaked dough strands are advanced in the direction of their longitudinal extent. If such a dough strand is located in the operating region of the twisting machine, the belt is stopped in each case and the pretzel is twisted deposited on the same transporting belt. Then, the next dough strand is advanced under cycle control.

This possibility of advancing the dough strands on a transporting belt in the direction of their longitudinal extent facilitates feeding of the rolled dough strands onto the transporting belt shoe the dough strands, in this manner, simply have to be rolled onto the transporting belt over an oblique plane.

In addition, a turning device may be provided downstream of the twisting machine in order, before finishing off the pretzels, that is to say dipping them in salt solution and salting them, to turn said pretzels since the hitherto upper side is less attractive, due to the press-fixing of the dough joins, and should be changed around to the underside.

In the case of a pretzel-twisting machine of this type, the receiving mold part can be pivoted through at least 180° preferably 270° around a horizontal pivot spindle which is arranged above the dough strand and is located parallel to the same, it having to be possible for both vertical positions of the receiving mold part, that is to say with its symmetrical, central round portion to the top or bottom, to be reached.

In this arrangement, the height position of this pivot spindle has to be variable in order to be able to bring the receiving mold part into contact with the dough strand and also, for carrying out the lifting movement, to be able to raise the receiving mold part sufficiently far above the underlying surface, and thus raise the original level of the dough strand.

For this purpose, said horizontal pivot spindle is accommodated in a carrier head for the receiving mold part. By means of corresponding intermediate elements, this carrier head can be varied in height with respect to a stationary basic framework, can also be pivoted around the vertical spindle and can be displaced in the transverse direction with respect to the dough strand.

This can be achieved, for example, in that the carrier head is mounted such that it can be pivoted about an essentially vertically running spindle with respect to a head base arranged thereabove, and said head base can be changed both in the transverse direction of the dough strand and in terms of height with respect to a fixedly arranged machine basic framework.

The attachment of the head base on the basic framework can take place preferably via a pivot lever which is fastened pivotably on the basic framework, on the one hand, and on the head base, on the other hand, and runs essentially horizontally, but can be tilted around the bearing point in the basic framework.

Consequently, the head base can be adjusted not only in height, but also in its position to be assumed in the transverse direction with respect to the dough strand, in that the head base, and thus also the vertical spindle between head base and carrier head, can be pivoted around the bearing point in the pivot lever and can thus be deflected out of the vertical.

In this manner, all the positions to be reached and movement sequences necessary for the process can be realized.

In this arrangement, the receiving mold part itself has to be capable of moving either through 180° or through 270° around its horizontal pivot spindle, depending on whether, for receiving the dough strand, the receiving mold part is to be moved towards the dough strand more in the horizontal position or more in the vertical position. Preferably, the entire apparatus is arranged above the transporting belt for the dough strands, with the result that there is no spatial obstruction for other units in the region of the plane of the dough strands.

The twisting machine also comprises movable holding-down devices which are intended for the dough strand located in the processing position and by means of which the ends of the dough strand are held in a defined position and prevented from raising prematurely from the underlying surface. These holding-down devices are only closed around the ends of the dough strand when the latter is located correctly with respect to the twisting machine.

In order to optimize this positioning there is provided a measuring and positioning device, which also permits subsequent, central alignment of the dough strand, which is normally located on the transporting belt.

The length of the dough strands, too, is not always the same since, due to the rolling of the dough strands, very different lengths of the dough strand may result, with the same quantity of dough, due to the contact pressure not always being the same.

Admittedly, the desired hallmark of the hand-made pretzels is that the length of the overhanging ends is not always the same in a finished pretzel. Indeed, it depends on the length of the original dough strand and on the skill of the pretzel twister, etc.

This feature can thus readily remain intact, even in the case of mechanically twisted pretzels, but overly long overhanging ends cannot be accepted since, in some circumstances, they would come into contact with adjacent pretzels during freezing or baking.

On the other side of the coin, the overhang may also not be dimensioned too sparingly since then, in the case of undersized dough strands, there would, in some circumstances, in the case of a receiving mold body with a non-changeable circumference, be no joining of the ends of the dough strand with the overlapping regions.

In order to avert this danger, it is conceivable that the circumferential surface of the receiving mold part does not have a non-changeable configuration, but can be changed during the handling operation in that, for example, said circumferential surface consists of a flexible material.

In this case, upon receiving the dough strand, said circumferential surface may have a contour which is bent to a lesser extent, and which is fully linear and straight in the ideal case, and thus said surface can be moved to the full extent towards the dough strand which is to be received, and the latter can be received, in a problem-free manner.

During swinging upwards of the receiving mold part, the circumferential surface of the receiving mold part is then bent together to form the final contour, which, indeed, then corresponds to the inner contour of the subsequent pretzels.

The size of this circumferential contour in the end state could then—depending on prior measurement of the initial length of the dough strand—be adapted to the initial length of said dough strand, with the result that, essentially irrespective of the length of the dough strand, a pretzel of optimum shape and with optimum end overhang is always obtained.

In the same way, further optimization of the operating sequence can be achieved in that the grippers by means of which the dough strand is secured on the receiving mold part are not moved always into the same closed position, but that the end point of the closed position depends on previous measurement of the thickness of the dough strand in this region.

For these optimizing steps, additional devices would thus have to be provided at one or more positions for measuring the length of the dough strand and, if appropriate, for measuring the thickness of the dough strand.

A few embodiments according to the invention are explained in more detail hereinbelow by way of example. The figures with odd numbers each show a view as seen in the direction of the original extent of the dough strand, while the figures with even numbers indicate the associated view as seen in the horizontal direction, at 90° with respect to the direction in which the odd-numbered figures are viewed, to be precise:

Figure 1:
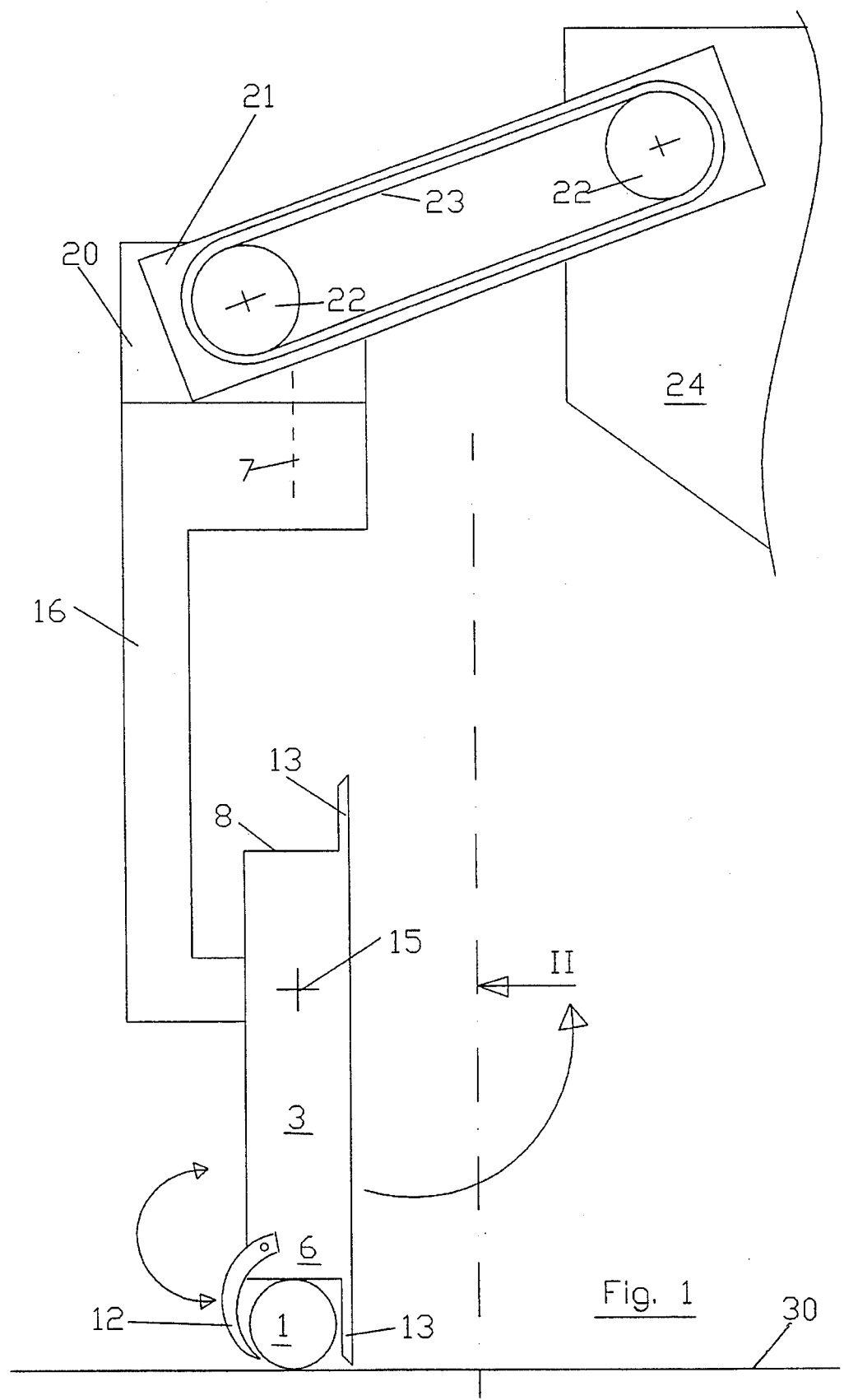
FIG. 1 shows a side view when the dough strand is being seized.
Figure 3:
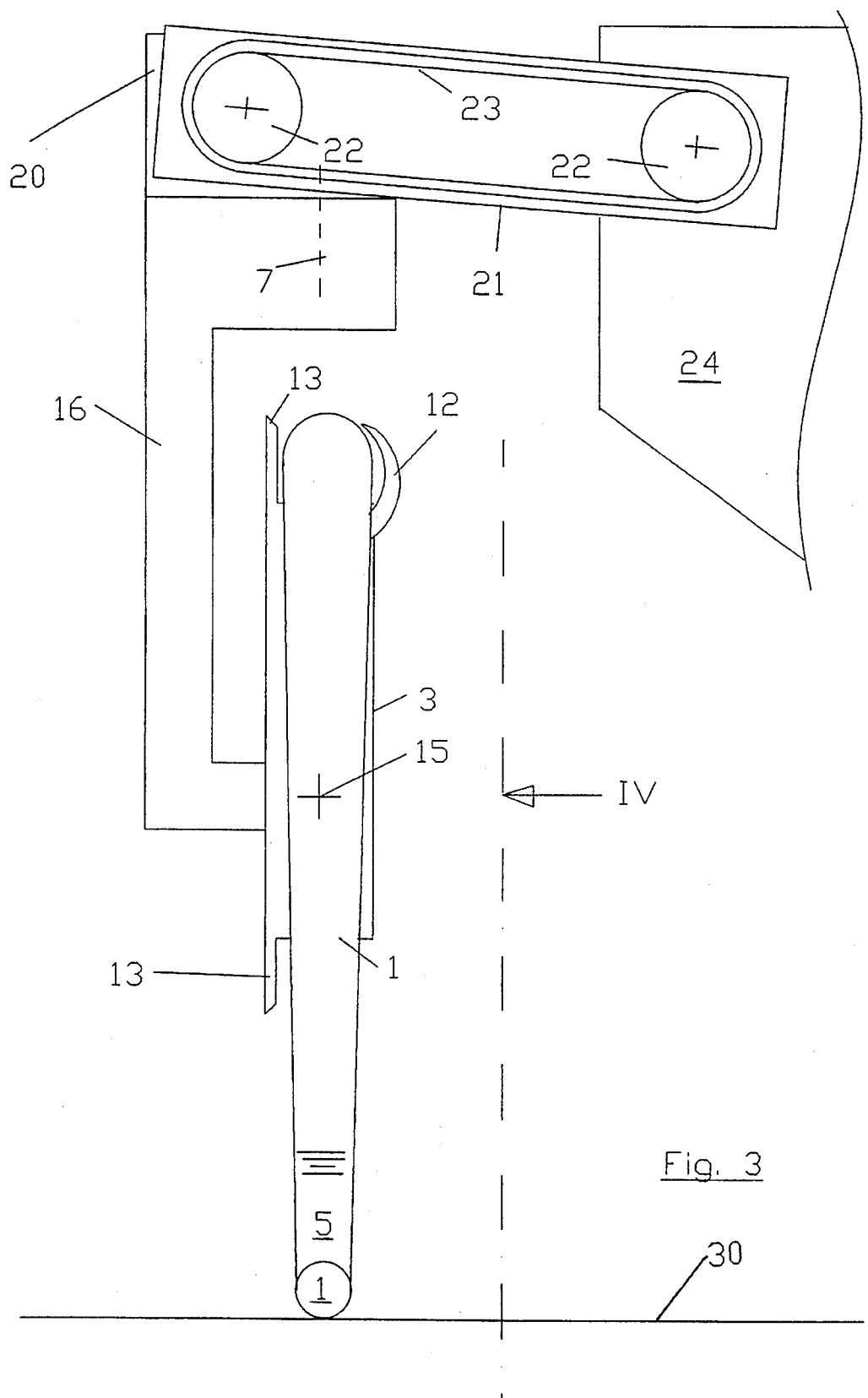
FIG. 3 shows a side view with the dough strand pivoted upwards.
Figure 4:
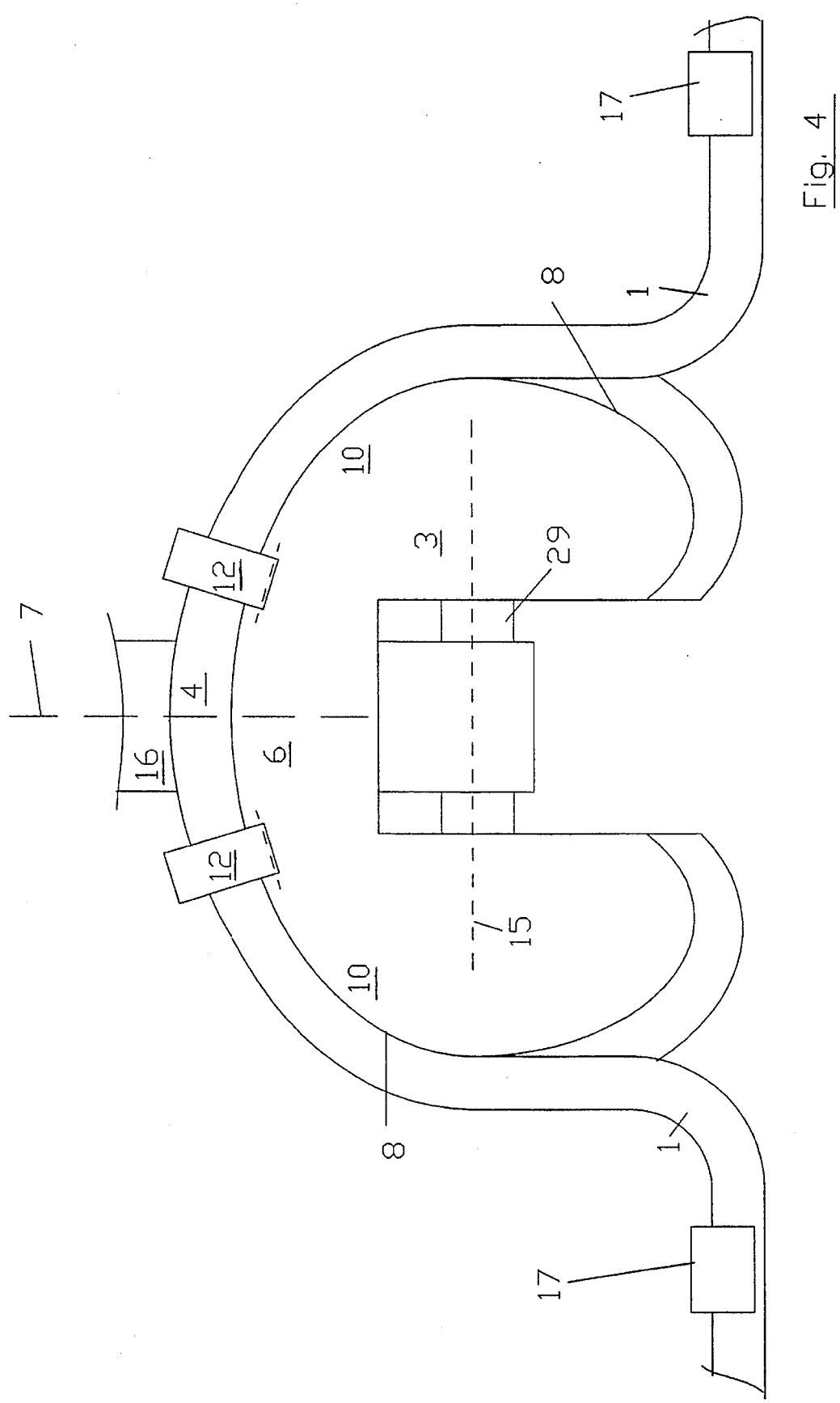
Figure 5:
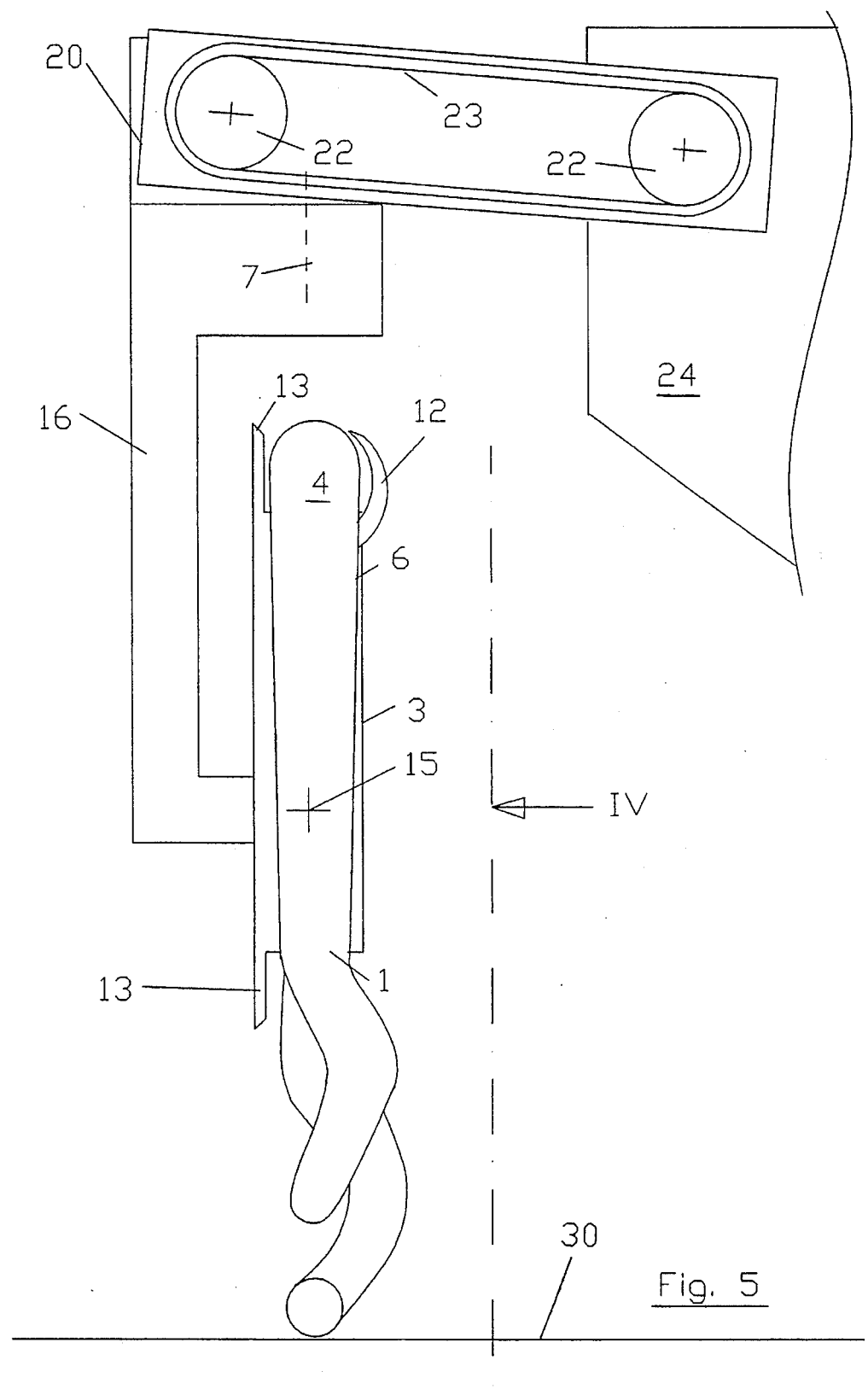
Figure 6:
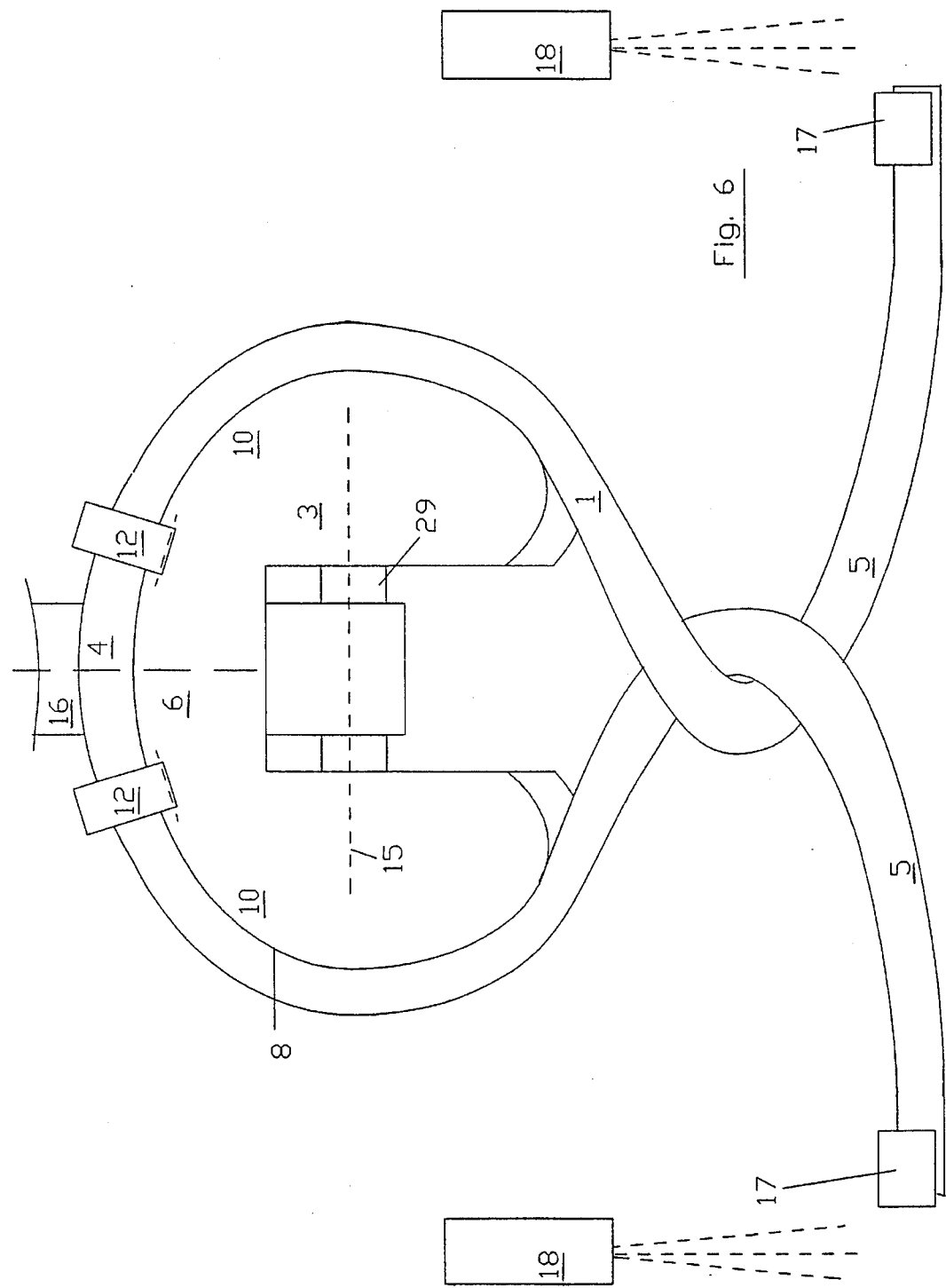
Figure 7:
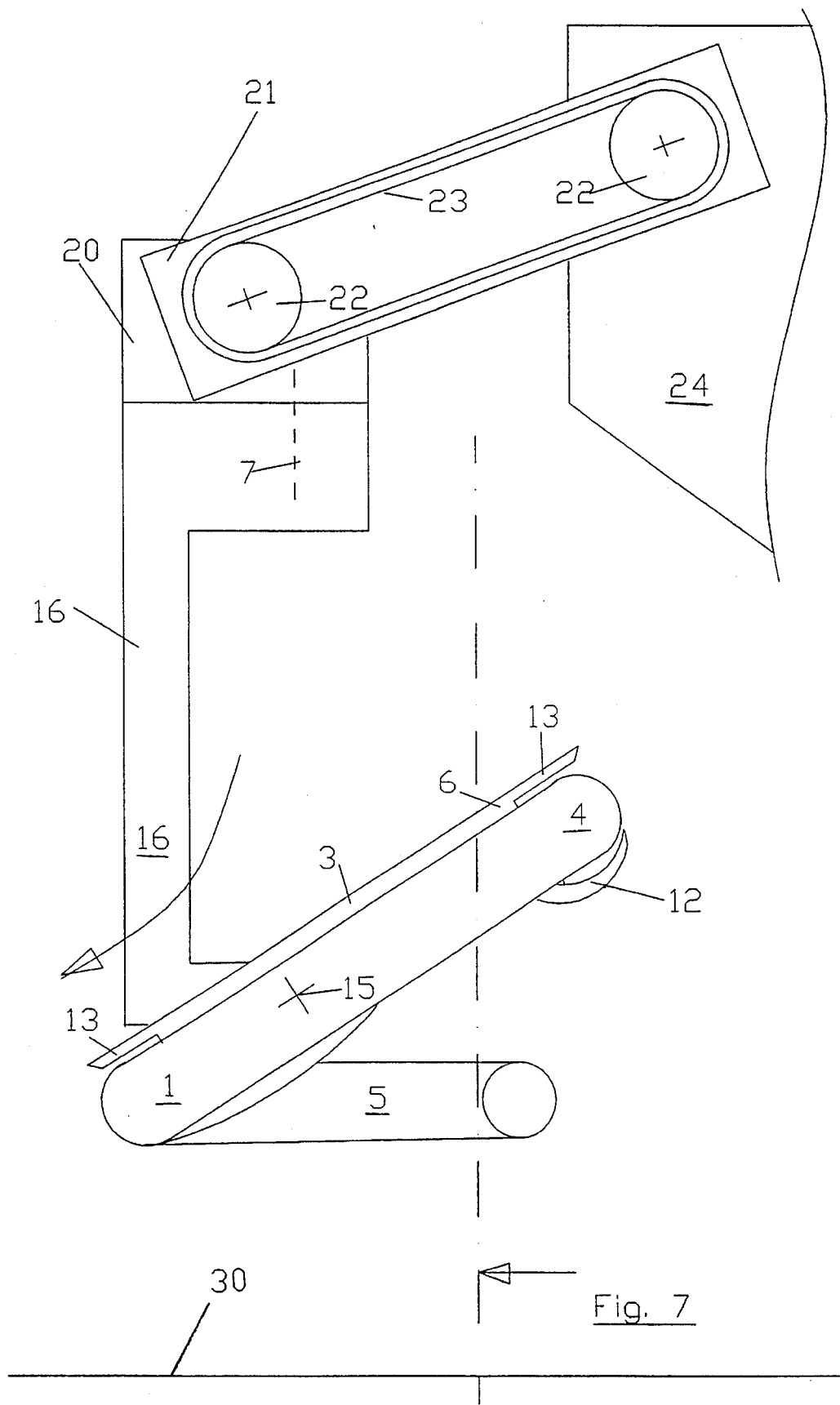
Figure 8:
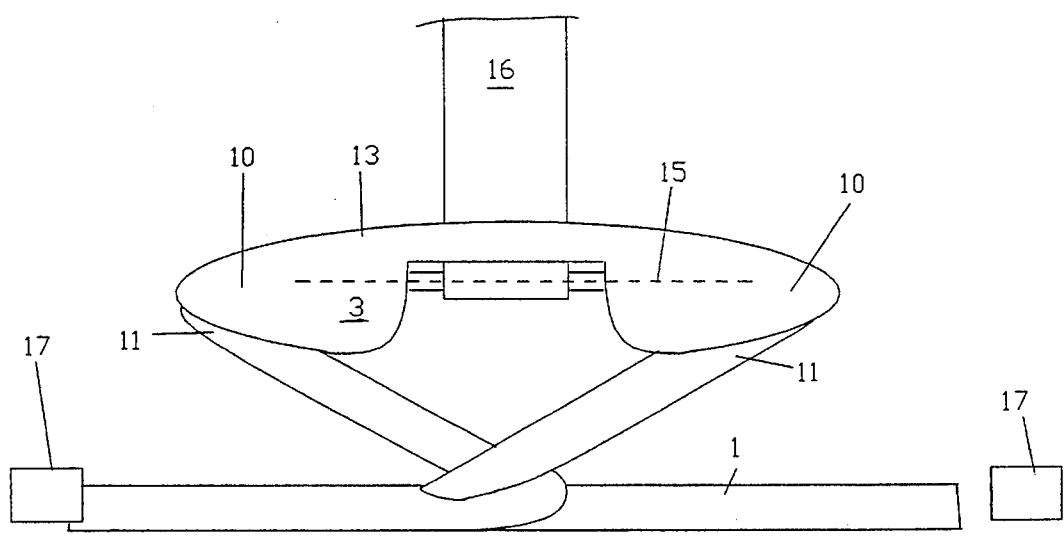
Figure 9:
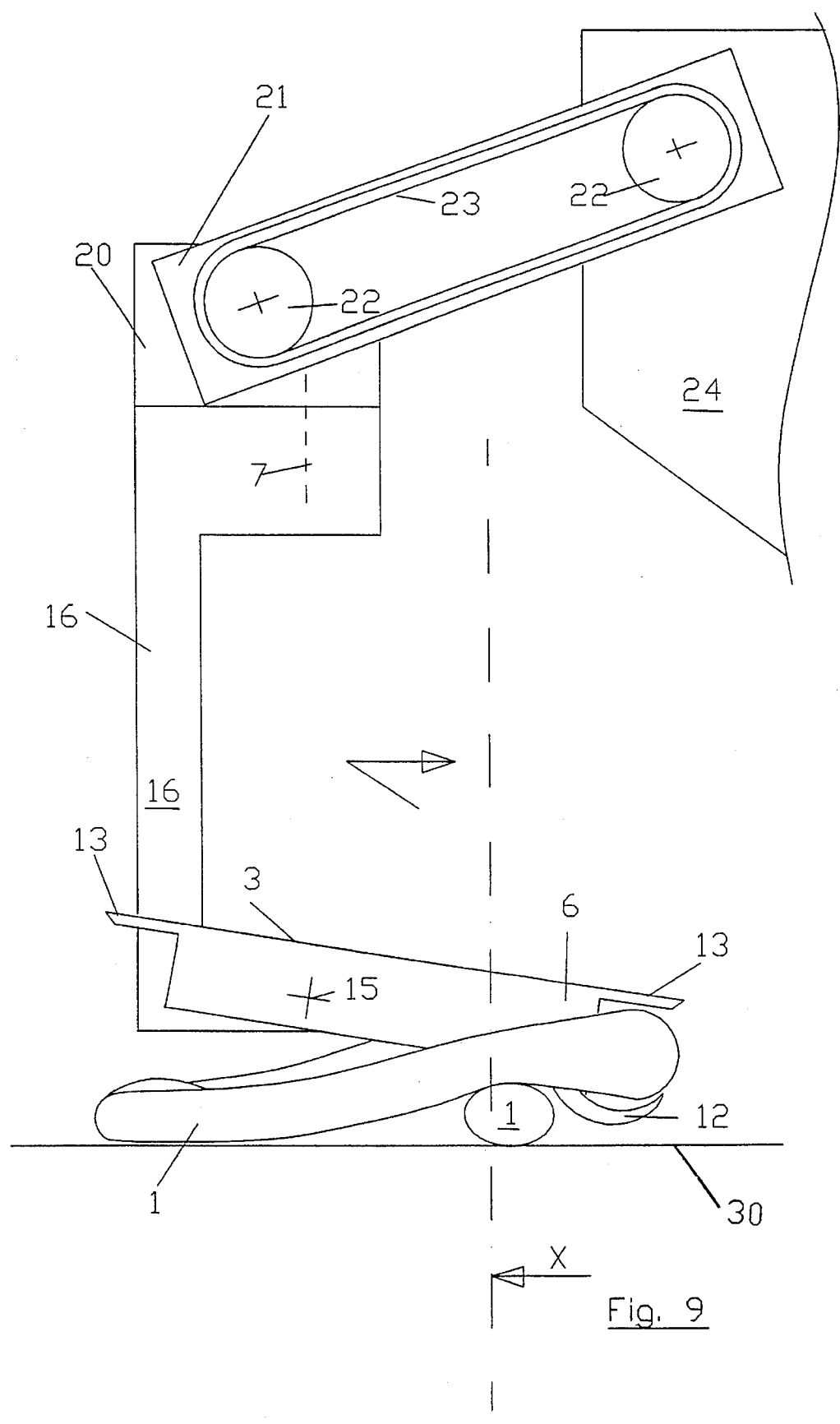
Figure 10:
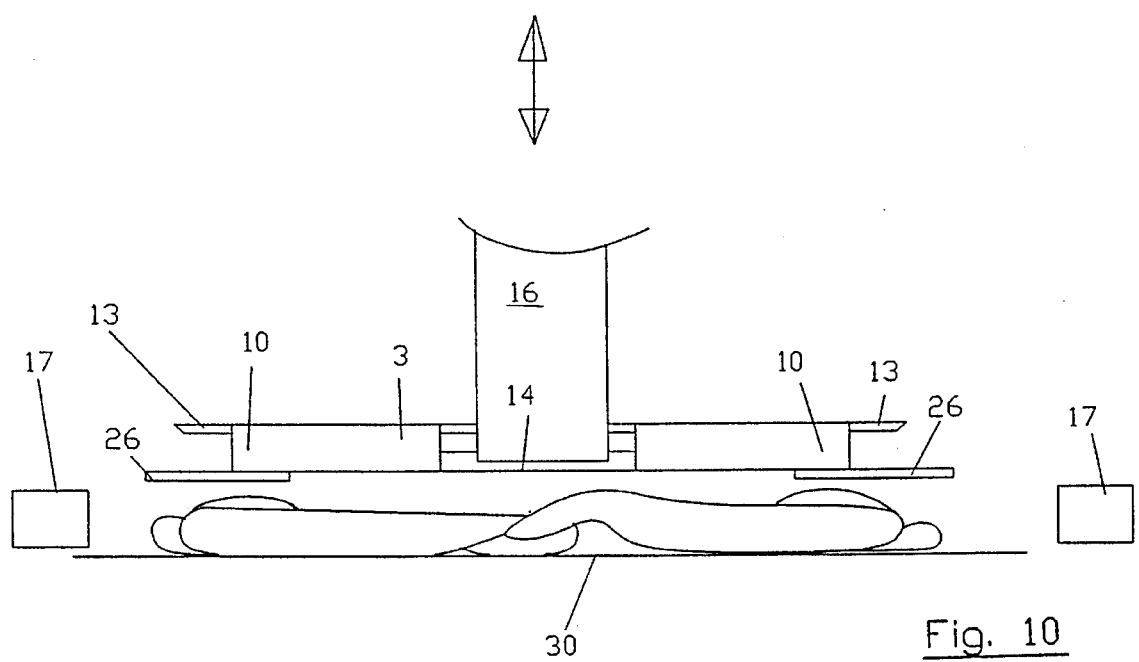
Figure 11:
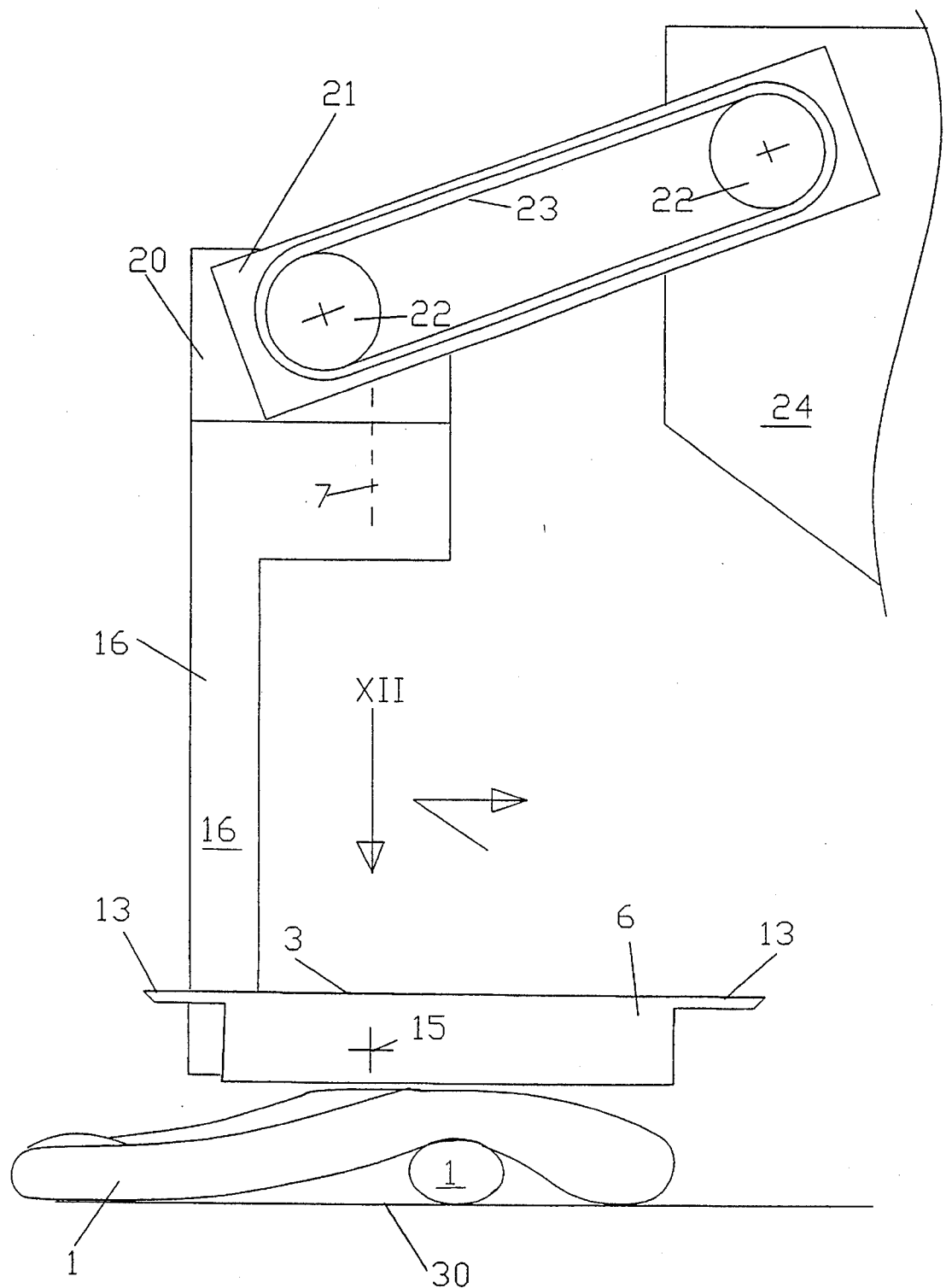
Figure 12:
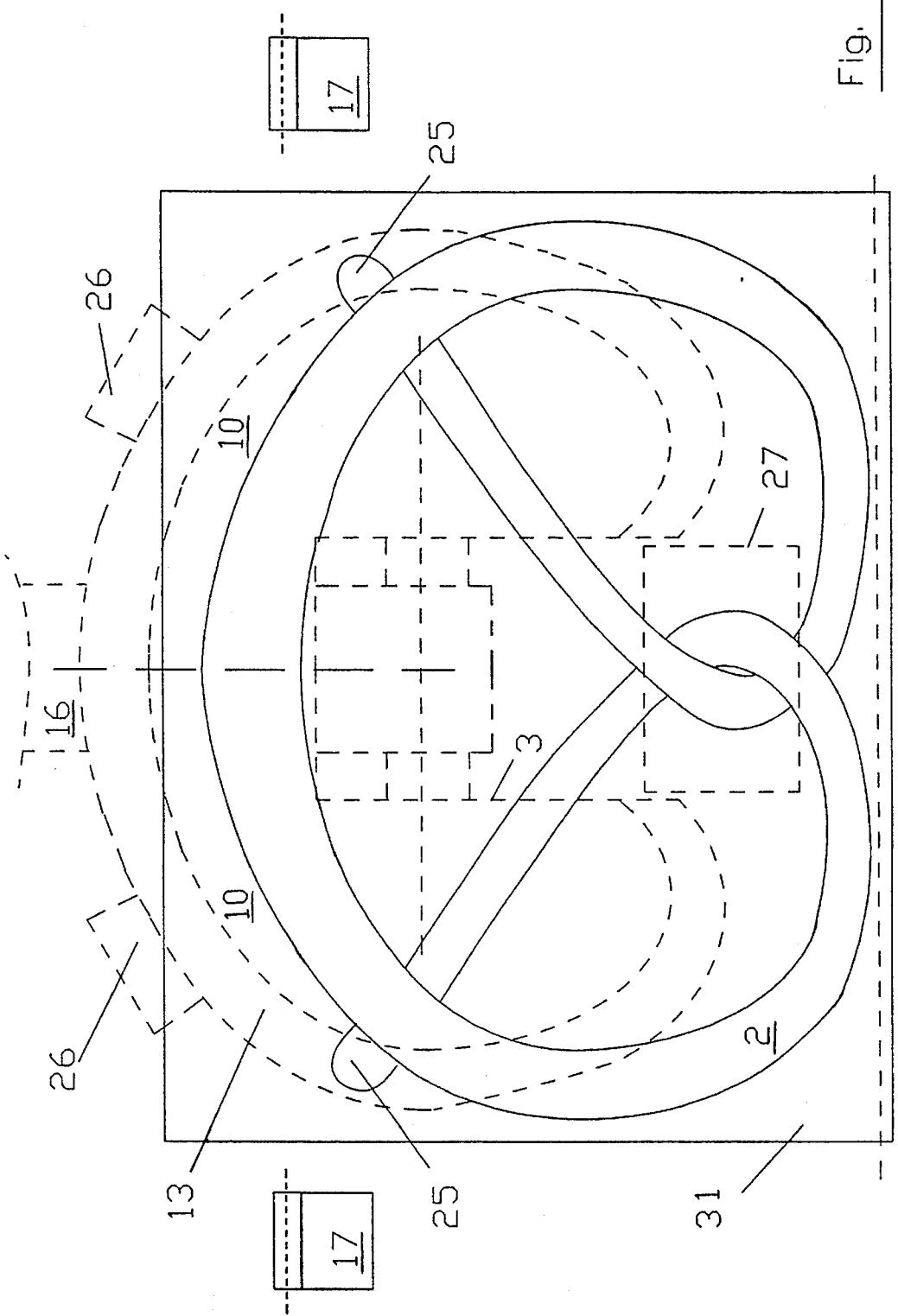
Figure 13:
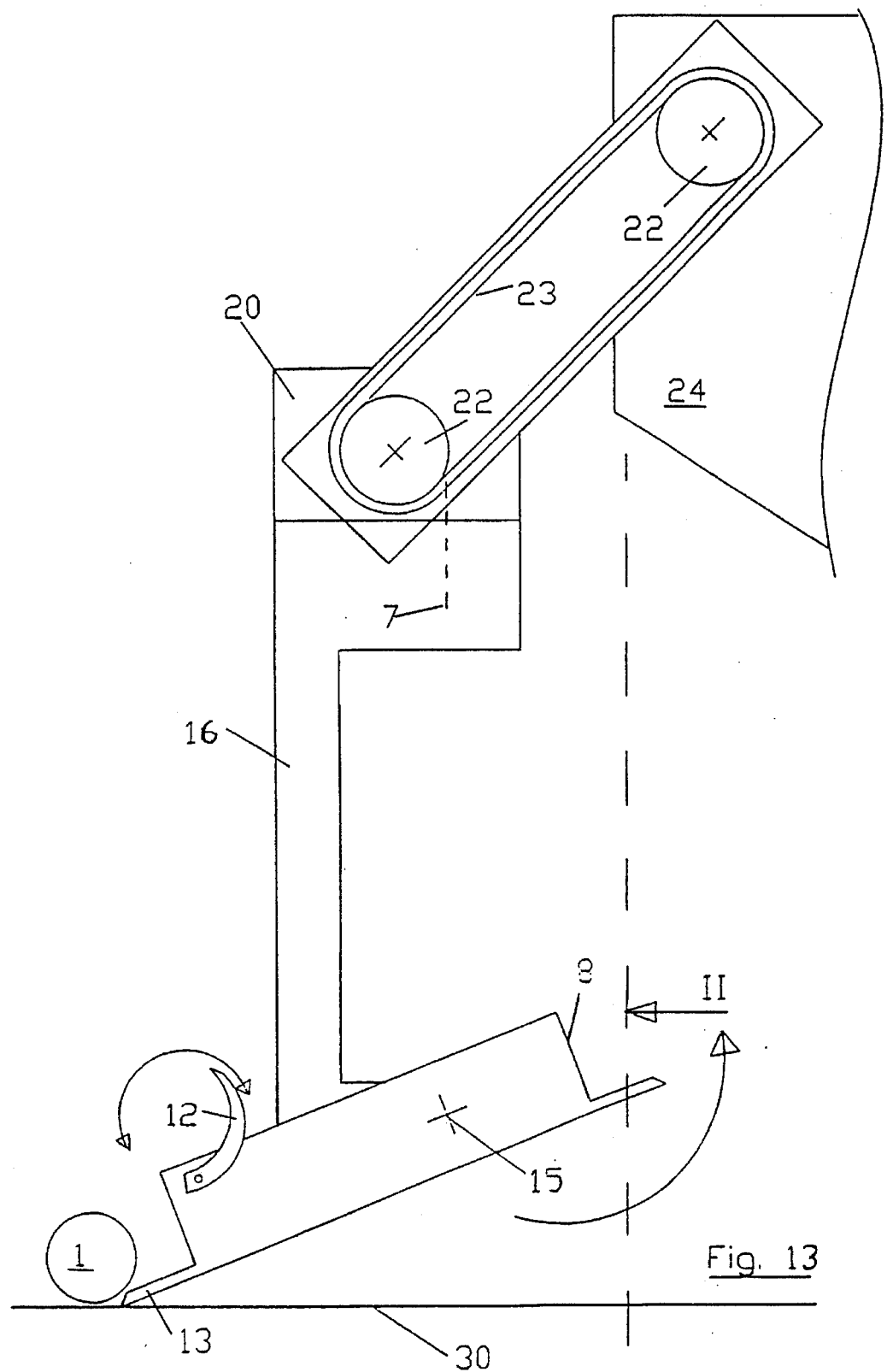

FIG. 4 shows a front view according to FIG. 3, FIG. 5 shows a side view in which the dough strand has already been twisted, FIG. 6 shows a front view according to FIG. 5, FIG. 7 shows a side view in which the rear region of the twisted pretzel is just being deposited, FIG. 8 shows a front view according to FIG. 7, FIG. 9 shows a side view in which the last, central region of the dough strand is also being deposited from the receiving mold part, FIG. 10 shows a front view according to FIG. 9, FIG. 11 shows a side view during press-fixing of the dough joins, FIG. 12 shows a plan view of the ready-twisted deposited pretzel with the receiving mold part, arranged above, pressing on it, and FIG. 13 shows a representation similar to FIG. 1, but with the dough strand being received by the receiving mold part being moved towards it essentially horizontally.

FIG. 1 shows, in side view, the receiving mold part 3 which, in the vertical position, has been moved onto the dough strand vertically, with its front region 6 oriented downwards, and, in order to seize the dough strand, the gripper 12 has been closed.

Figure 2:
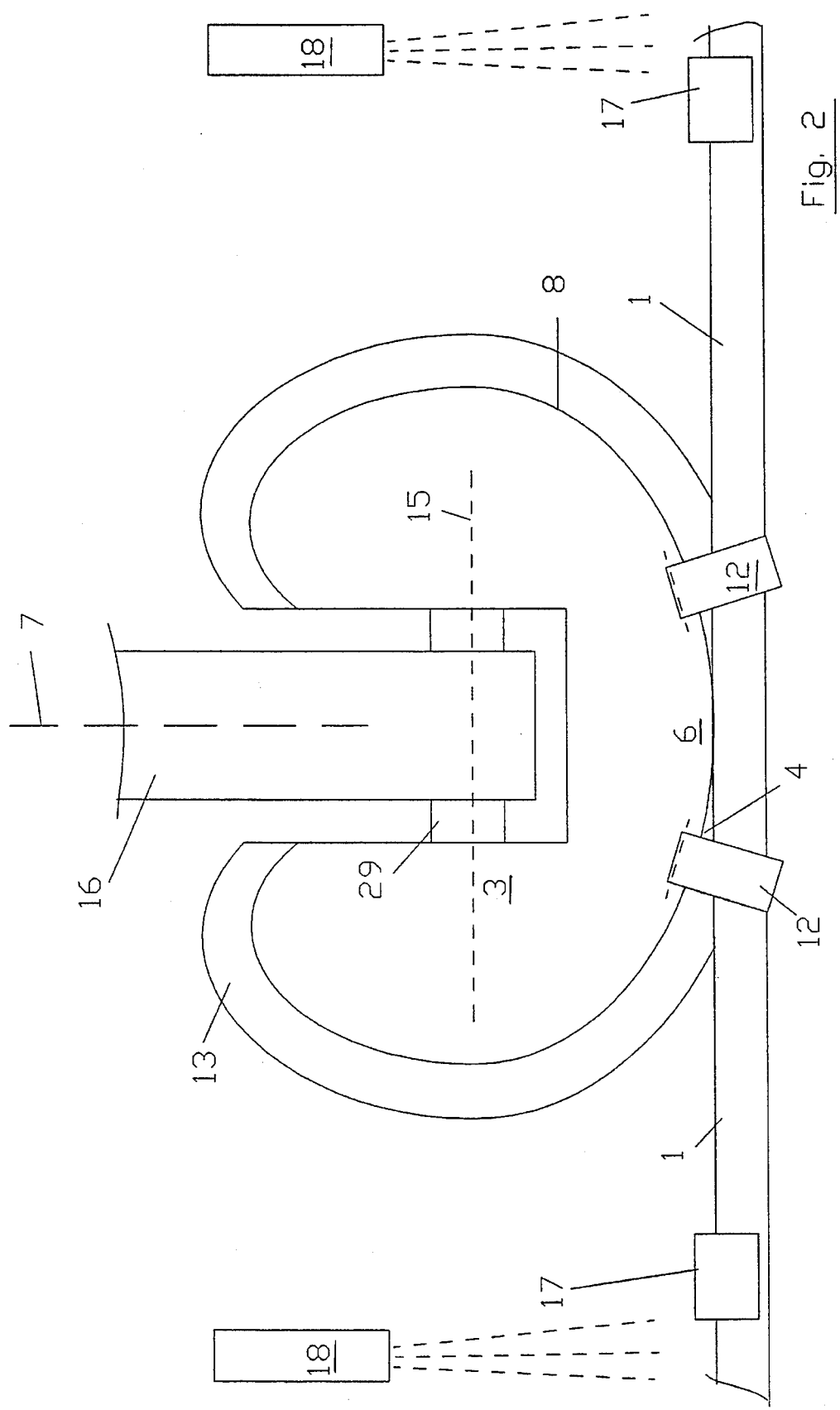
FIG. 2 shows a front view according to FIG. 1.

Consequently, the central part 4 of the dough strand 1 is held between a supporting edge 13, which runs around the gripper edge of the receiving mold part and extends in the plane of the receiving mold part, and two grippers 12, which can be seen to better effect in the front view of FIG. 2.

In this arrangement, the carrier head 16, about whose lower end the receiving mold part 3 can be pivoted rearwards around the horizontal spindle 29 having an axis 15, is located an approximately vertical position, as is the vertical rotary spindle 7 between the carrier head 16 and the head base 20 arranged thereabove.

In order to bring the receiving mold part into contact with the dough strand located on the transporting belt, the entire unit has to be lowered, this taking place in that the lever 21 which connects the head part 20 to the basic framework 24 is pivoted obliquely downwards around the bearing point in the basic framework 24.

The drive for the movement of the receiving mold part along said pivot lever 21 takes place via gear wheels 22, arranged on the pivot pins of the lever, said pivot pins being located on both sides of said lever, and via a chain 23 which runs around said gear wheels. Of course, all other types of transportation elements are also conceivable.

The movements of the receiving mold part with respect to the carrier head 16 take place preferably by pneumatic transition morns, for which purpose there is a ring feeding of compressed air in the interior of the rotary spindle 7, with the result that the carrier head 16, together with receiving mold part 3, does not have to be rotated back into the initial position in the no-load state, after the twisting movement through 360° has been carried out, but continuous further rotation is possible. This means that the downtimes are reduced and the output rate of the machine is increased.

A modification of the solution represented in FIG. 1, FIG. 13 shows a solution in the case of which the receiving mold part 3, for receiving the dough strand 1, is moved towards the dough strand 1 not vertically from above, but approximately horizontally, with the receiving mold part in an oblique position. In this arrangement, the front region of the receiving mold part 3 is moved towards the dough strand 1 horizontally such that the supporting edge 13, which then projects on the underside of the receiving mold part 3, is pushed in approximately beneath the dough strand 1, which is then securely received by virtue of closure of the gripping members 12.

As can be seen to better effect in FIG. 2, the receiving mold part has an outer circumferential surface 8 corresponding to the inner contour of the subsequent pretzel. Running around said circumferential surface 8, and projecting with respect to it, is the supporting edge 13 which, when the receiving mold part is in the vertical position, protects the dough strand from falling out laterally, and, when the receiving mold part is in the horizontal position, the arrangement of the supporting edge 13 on the underside bears the dough strand 1.

The approximately heart-shaped configuration of the receiving mold part can be seen in FIG. 2, and the lower end of the carrier head 16 projects into the central gap in said heart-shape, opposite which carrier head 16 the receiving mold part is mounted via spacer bushings 29 along the horizontal pivot spindle 15.

After receiving the dough strand, the receiving mold part 3—as is indicated in FIG. 1 by the arcuate arrow—is pivoted upwards to the rear through approximately 180°, the carrier head 16 being simultaneously drawn upwards slightly by means of the pivot lever 21 in order to raise the seized central part of the dough strand 1 from the underlying surface.

At the same time, the head base 20 can be pivoted, with the result that the receiving mold part 3, and thus the pivot spindle 15 thereof, move forwards, that is to say out of the vertical plane running through the dough strand 1. In this arrangement, an attempt is made to coordinate this vertical movement with the tilting movement around the pivot spindle 15, this having the result that the seized central part 4 of the dough strand 1 does not execute any transverse movement, but only a lifting movement vertically upwards. This makes it easier to lay the dough strand around the circumferential surface 8 of the receiving mold part in a problem-free manner.

As is represented in FIG. 4, after the receiving mold part, with the dough strand 1, has been swung upwards into the vertical position, the lateral parts of the dough strand 1 hand down freely from the side region 10 of the receiving mold part and, by means of a bend, extend outwards through the holding-down devices 17. From this position, the receiving mold part 3 is raised further until it has reached at least the height represented in FIG.3, and the dough strand 1 is rotated through 360° around the vertical spindle 7, arranged above the dough strand 1, with the result that twisting of the parts of the dough strand 1 which hang down on both sides of the receiving mold part 3 takes place, as can be seen in FIGS. 5 and 6. Even after the actual twisting movement has been carried out, the ends of the dough strand 1 may still be located beneath the holding-down device 17, as can likewise be seen in FIG. 6.

The twisted dough strand is then deposited and pressed in order to form a pretzel.

In a first step, the dough strand is thus deposited on the rear region of the receiving mold part—as is represented in the side view of FIG. 7.

It can be seen there—represented by the arcuate arrow—that first of all the rear part of the twisted dough strand, that is to say that region of the dough strand i which is on the left-hand side in FIG. 7, is deposited on the underlying surface 30 in that the receiving mold part 3 is tipped back approximately into the horizontal and, at the same time, the carrier head 16 is moved slightly to the left, as seen in FIG. 7, that is to say it is moved forwards out of the position above the ends 5 of the dough strand 1, with the result that the ends of the dough strand come to lie at the desired location beneath the transition between the central part 4 and the outer region 11 of the pretzel.

The ends 5 of the dough strand 1 are, at the latest, drawn out of the holding-down devices 17 to the full extent by said transverse movement and thus lie freely beneath said transition region of the pretzel 2.

In this state, the central region 4 of the dough strand cannot fall off the receiving mold part since it is held there, as before, by the gripping arms 12.

The front region of the pretzel 2, that is to say the region thereof which is on the right-hand side in FIG. 7, is then, however, to be released from the receiving mold part 3. For this purpose, the mold part 3, after reaching the underlying surface 30, moves linearly to the right again slightly, that is to say to the initial position of the dough strand. Consequently, the dough strand is expanded slightly in its side region 11, with the result that region which is at the rear in FIG. 7 no longer rests on the circumferential surface 8 of the receiving mold part.

Thereafter, the receiving mold part 3 is tilted with its front region 6 downwards and with its rear region upwards, but there is no longer any dough strand adhering on the rear region of the receiving mold part 3. By lowering the front region, with the central part 4 of the dough strand 1, the latter passes onto the underlying surface 30, usually the transporting belt, and remains there after the gripping members 12 have been released.

For the subsequently desired pressing of the dough crossover points, two different possibilities may be chosen: for one possibility, in the operating position represented in FIG. 9, the receiving mold part is moved into an approximately horizontal position by lowering the pivot spindle 15 and then, by further lowering, the overlapped ends 25 of the dough strand are press-fixed by the dough strand running thereabove by means of the supporting edge 13, which is, at this point, located on the upper edge of the receiving mold part 3.

In this arrangement, the situation may, nevertheless, arise where imprints show on the end regions running outwards within the pretzel Another possibility is, from the position represented in FIG. 9, to draw back the receiving mold part 3 obliquely upwards and forwards, that is to say to the left in FIG. 9, in order to move the receiving mold part 3 completely out of contact with the dough strand 1. Thereafter, the receiving mold part, after it has moved into the horizontal position, is then displaced to the right again, that is to say to the front, until it assumes the position, in the plan view according to FIG. 12, above the shaped pretzel, which is located thereebeneath.

For the sake of better understanding the outer contour of the receiving mold body 3 is drawn in simply in broken lines.

By virtue of this offset in transverse direction with respect to the original dough strand, the side regions 10 of the receiving mold part, which are the points located furthest apart, pass approximately over the ends of the dough strand 1, with the result that, in this position, the ends of the dough strand can be press-fixed by lowering the receiving mold part. The same is possible for the central knot in that a corresponding transverse movement from the position of FIG. 12 is previously carried out by the receiving mold part 3 or a central pressure-exerting surface 27, likewise drawn in FIG. 12 only by broken lines, is provided on the receiving mold part for the purpose, but, in order not to obstruct the previous steps, can be swung down into the plane of the receiving mold part 3 only for this operation.

For better pressing of the overlaps of the end regions, use may also be made of lateral pressing plates 26, projecting laterally beyond the receiving mold part, on the underside of said receiving mold part 3—in this position—said pressing plates obviously having to be capable of extending. The function of these lateral pressing plates may also be fulfilled by the gripping members 12 present at these locations, provided that said gripping members are of a sufficiently flat design and have a planar outer contour.

In addition, a turning device 31 may be provided downstream of the twisting machine in order, before finishing off the pretzels, that is to say dipping them in salt solution and salting them, to turn said pretzels since the hitherto upper side is less attractive, due to the press-fixing of the dough joins, and should be changed around to the underside.

The length of the dough strands, too, is not always the same since, due to the rolling of the dough strands, very different lengths of the dough strand may result, with the same quantity of dough, due to the contact pressure not always being the same.

Admittedly, the desired hallmark of the hand-made pretzels is that the length of the overhanging ends is not always the same in a finished pretzel. Indeed, it depends on the length of the original dough strand and on the skill of the pretzel twister, etc.

This feature can thus readily remain intact, even in the case of mechanically twisted pretzels, but overly long overhanging ends cannot be accepted since, in some circumstances, they would come into contact with adjacent pretzels during freezing or baking.

On the other side of the coin, the overhang may also not be dimensioned too sparingly since then, in the case of undersized dough strands, there would, in some circumstances, in the case of a receiving mold body with a non-changeable circumference, be no joining of the ends of the dough strand with the overlapping regions.

In order to avert this danger, it is conceivable that the circumferential surface 8 of the receiving mold part 3 does not have a non-changeable configuration, but can be changed during the handling operation in that, for example, said circumferential surface consists of a flexible material.

In this case, upon receiving the dough strand, said circumferential surface 8 may have a contour which is bent to a lesser extent, and which is fully linear and straight in the ideal case, and thus said surface can be moved to the full extent towards the dough strand which is to be received, and the latter can be received, in a problem-free manner.

During swinging upwards of the receiving mold part, the circumferential surface of the receiving mold part is then bent together to form the final contour, which, indeed, then corresponds to the inner contour of the subsequent pretzels.

The size of this circumferential contour in the end state could then—depending on prior measurement of the initial length of the dough strand—be adapted to the initial length of said dough strand, with the result that, essentially irrespective of the length of the dough strand, a pretzel of optimum shape and with optimum end overhand is always obtained.

In the same way, further optimization of the operating sequence can be achieved in that the grippers by means of which the dough strand is secured on the receiving mold part are not moved always into the same closed position, but that the end point of the closed position depends on previous measurement of the thickness of the dough strand in this region.

For these optimizing steps, additional devices 18 would thus have to be provided at one or more positions for measuring the length of the dough strand and, if appropriate, for measuring the thickness of the dough strand.

I claim:

1. A process for deforming a straight dough strand to form a pretzel, the dough strand having a central portion and having two ends, the process comprising the steps of:

receiving from a plane surface the central portion of the straight dough strand in a front region of a receiving mold part, said front region having a circumferential surface at least partly adapted to the form of a pretzel;

tilting upward into an approximately vertical position the receiving mold part thereby lifting the center portion of the dough strand;

rotating through approximately a full revolution relative to the ends of the dough strand the receiving mold part, with the central part of the dough strand therein, about an axis approximately perpendicular to the plane surface, thereby twisting the dough strand;

displacing the receiving mold part relative to the ends of the dough strand, the displacement being in a direction and perpendicular to the line delimited by the ends of the dough strand;

tilting downward the receiving mold part into nearly parallel arrangement with the plane surface to deposit the dough strand upon the plane surface;

releasing the pretzel from the receiving mold part; and pressing at least one portion of the dough strand near the center of the dough strand into a portion of the dough strand near the ends of the dough strand to form the dough strand into a pretzel.

2. The process as claimed in claim 1, wherein, to receive the central portion of the dough strand, the receiving mold part is brought towards the dough strand approximately vertically from above, with a front region of the receiving mold oriented downwards, and the dough strand is held on the circumferential surface of the receiving mold part by means of gripping members fitted on at least one side of the front region of said receiving mold part.

3. The process as claimed in claim 2, wherein the receiving mold part has, on at least one of its sides, a peripheral supporting edge which projects beyond the circumferential surface.

4. The process as claimed in claim 3, wherein, upon receiving the central portion of the dough strand, the receiving mold part is brought towards the dough strand approximately horizontally from the front, with its front region oriented rearwards, and the dough strand is held on the circumferential surface of the receiving mold part by means of gripping members fitted on at least one side of the front region of said receiving mold part.

5. The process as claimed in claim 4, wherein, upon receiving the central portion (4) of the dough strand, the circumferential surface of the receiving mold part is linear and is deformed to give a bent outer contour before the rotating of the receiving mold around an axis approximately perpendicular to the plane surface.

6. The process as claimed in claim 5, wherein, upon receiving the central portion of the dough strand by the receiving mold part, the receiving mold part executes a transverse movement in addition to its tilting movement around the horizontal spindle, with the result that the central portion of the dough strand always remains essentially in the same vertical plane.

7. The process as claimed in claim 6, wherein the receiving mold part has extendible lateral pressing plates, projecting beyond its side regions, for pressing the ends beneath the twisted pretzel.

8. The process as claimed in claim 7, wherein a central pressure-exerting surface for final pressing of the central knot of the pretzel is arranged approximately in the center of the receiving mold part.

9. The process as claimed in claim 8, wherein the dough strands are moved cyclically, alternately being moved and stopped, into an operating region beneath the receiving mold part and, during a time when the dough strands are stopped, are twisted to form a pretzel.

10. The process as claimed in claim 9, further comprising the step of turning the pretzel over and depositing it on its hitherto upper side.

11. An apparatus for deforming a straight dough strand to form a pretzel comprising:

a receiving mold part pivotable through 180° around a pivot spindle and having at least one gripper for grasping a dough strand, the spindle being located above and with an axis substantially parallel to the extent of the dough strand, the receiving mold part having a circumferential surface at least partly adapted to the form of a pretzel; and a carrier head for carrying the pivot spindle attached to a framework permitting the carrier head to be displaced in a direction perpendicular with respect to the dough strand, the carrier head and the receiving mold rotatable about a vertical axis.

12. The apparatus as claimed in claim 11, wherein the receiving mold part and the carrier head bearing it are fastened on a basic framework, above the plane of the dough strands.

13. The apparatus as claimed in claim 12, wherein movable holding-down devices are arranged in the vicinity of each end of the dough strand such that, upon twisting of the dough strand, the ends of the dough strand are still located beneath the holding-down devices.

14. The apparatus as claimed in claim 13, wherein there is at least one measuring and positioning device for determining and compensating for the central position of the dough strand.

15. The apparatus as claimed in claim 14, wherein there is arranged at least one measuring and positioning device for determining the length of the dough strand.

16. The apparatus as claimed in claim 15, wherein the receiving mold part consists of a flexible material with a changeable final circumference, and the final circumference is regulated during twisting in dependence on the length of the dough strand.

17. The apparatus as claimed in claim 16, wherein a closed position of the gripping members of the receiving mold part is established in dependence on a previously measured thickness of the dough strand at the locations which are to be seized.

18. The apparatus as claimed in claim 17, further comprising a turning device for turning over the twisted pretzel onto the hitherto upper side.

19. The apparatus as claimed in claim 11, wherein the receiving mold part has at least one circumferential surface that is deformable from a first shape to a second shape.

20. An apparatus for deforming a straight dough strand to form a pretzel comprising:

a receiving mold part pivotable through 270° around a pivot spindle and having at least one gripper for grasping a dough strand, the spindle being located above and with an axis substantially parallel to the extent of the dough strand, the receiving mold part having a circumferential surface at least partly adapted to the form of a pretzel; and a carrier head for carrying the pivot spindle attached to a framework permitting the carrier head and receiving mold part to be displaced in a vertical direction with respect to the dough strand so that the receiving mold part can reach the dough strand and so that the receiving mold part can be moved in a direction perpendicular with respect to the dough strand direction.

* * * * *